Patented Apr. 19, 1938

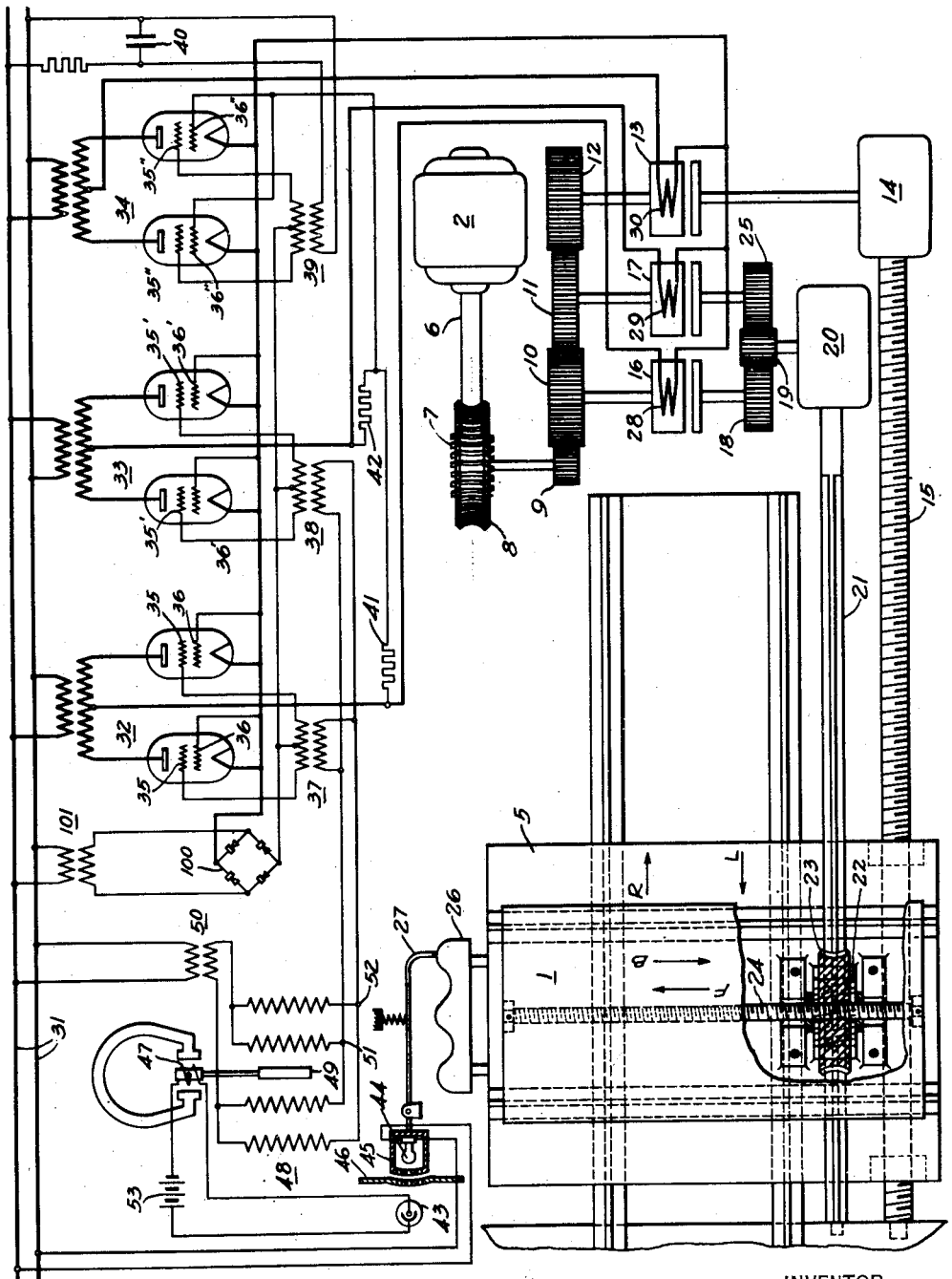

2,114,835

UNITED STATES PATENT OFFICE 2,114,835

ELECTRIC CONTROL FOR WORKPIECE SHAPING TOOLS

Walter Fouquet, Berlin-Siemensstadt, Germany, assignor to Westinghouse Electric & Manufacturing Company, East Pittsburgh, Pa., a corporation of Pennsylvania Application July 11, 1936, Serial No. 90,211
In Germany July 20, 1935

4 Claims. (Cl. 82—14)

This invention relates to a system of control, or systems of control, for tools, and more particularly to systems of control utilizing photoelectric devices coacting with guiding means and electric discharge devices for controlling the relative movement of a tool and work-piece.

The use of a tracer or feeler coacting with a template or pattern to control a tool is generally known. With such devices magnetic couplings are usually used, which magnetic couplings are energized in response to changes in the position of the tracer, or feeler, and the tool is thus coupled for various directions of motion so that the work-piece may be shaped.

With the devices of the prior art difficulty is experienced with the control intermediate the tracer head and the magnetic couplings.

One object of my invention is to provide an effective control between the tracer head and the tool so that the work-piece will be shaped accurately and in correspondence to the shape of the template, or pattern.

Another object of my invention is to use photoelectric means, controlled by a tracer, and electric discharge devices, controlled by the photoelectric means, for energizing magnetic couplings that control the movement of a tool with reference to a work-piece.

A further object of my invention is the provision of a particularly advantageous structure of the control means connected between the working circuit and the control arrangement, that is, between magnetic couplings and the tracer which touches the template.

The characteristic features of my invention and other, as well as more detailed, objects, not hereinbefore recited, will be better understood from a study of the embodiment of my invention illustrated in the single figure of the drawing, accompanying this specification. The single figure shows my system of control diagrammatically and the apparatus it is to control is also shown somewhat diagrammatically.

The apparatus shown in the figure may be used with a planer, grinder, cutter, lathe, etc. The details of the machine constitute no part of my invention and are, therefore, not shown. Whatever the nature of the machine, either the tool must be moved or the work-piece must be moved.

With my arrangement I provide means for moving the tool relative to the work-piece. The tool support is indicated by reference number 1. The work-piece may or may not move, in any case with my system of control, as hereinbefore mentioned, the tool support 1 may be reversibly moved in two lines perpendicular to each other.

The cutting-tool support is provided with the usual tool-adjusting means for the tool (not shown) and is motivated by a motor 2 through a system of gears and clutches, diagrammatically shown in the figure.

The motor 2 is, in practice, a reversible motor so that the movement of the tool support may be selected to be either to the right or left. Once the direction of rotation of the motor has been selected then the tool support moves in the selected direction either intermittently or continuously, depending on whether or not one or the other of the magnetic couplings 3 or 4 is energized.

If the table 5 is to move toward the right the motor 2 is so energized that such motion takes place. The motor rotations are transmitted through shaft 6, worm 7, worm wheel 8, gears 9, 10, 11 and 12, magnetic clutch, or coupling 13, reduction gear box 14, screw shaft 15 to table 5. Through my system of control coupling 13 is only energized when neither of the magnetic couplings 16 and 17 is energized. When clutch, or magnetic coupling 16, is energized, the motor rotation is transmitted from gear 10 through coupling 16, gears 18 and 19, reduction gear 20, the splined shaft 21, worm 22, worm wheel 23 acting as a nut on screw shaft 24. The screw shaft 24 is journalled in the tool support 1 and the worm wheel 23 is constructed to rotate in bearings on table 5. The result thus is that tool support 1 moves forward as indicated by the arrow F.

When clutch 17 is energized, the motor rotation is transmitted from gear 11 through clutch 17, gears 25 and 19, reduction gear 20 to the splined shaft 21. Splined shaft 21 will operate in a different direction and in consequence the tool support 1 will be moved in the direction indicated by arrow B, that is, will move back.

To properly control the clutches 13, 16 and 17 I mount a template, or pattern 26 on table 5 and as the table 5 moves to the right the spring biased feeler, or tracer 27 follows the contour of the template 26.

The magnetic windings 28, 29 and 30 of the couplings 16, 17 and 13, respectively, are connected to an alternating current source of power 31 through three rectifier arrangements 32, 33, and 34. The rectifiers consist of gas or vapor discharge devices which are connected as two-way rectifiers. The cathodes of all of the discharge devices are electrically connected together and to one pole of the three magnet windings 28, 29 and 30 for reasons that will be explained later.

Each of the electric discharge devices has two control grids 35 and 36, 35' and 36', and 35" and 36", respectively, which grids serve the purpose of controlling the discharge or break-down of the devices. With my system of control the break-down thus controls the energization of the magnetic couplings 16, 17 and 13. The grids 36, 36' and 36" and all the cathodes are connected together while the grids 35, 35' and 35" obtain potential from the transformers 37, 38 and 39 in combination with the rectifier 100 and transformer 101. The discharging is effected by the so-called ignition characteristic control wherein the time point of ignition may be determined and displaced in time by changing the ignition characteristic of the discharge paths. The rectifiers 32 and 33 are so connected that the discharge paths are blocked or ignited according to whether the potential of the grid transformers 37 and 38 are in phase or in opposite phase to the anode potential of the respective discharge devices.

The discharge devices of the rectifier 34 have a somewhat different control. The potential transformer 39 is displaced by 90° with reference to the anode potential with the aid of a capacitor 40, and the ignition of the discharge devices of rectifier 34 depends on the potential of control grids 36" which grids are connected through resistors 41 and 42 to the windings 28 and 29 of the magnetic couplings 16 and 17.

It is to be noted here that the illustrated arrangement of the discharge devices is to be regarded merely as illustrative. Other known discharge devices may be utilized. For example, discharge devices with only a single control grid and a control of the time of ignition by phase displacement between the control potential and the anode potential may be utilized. Again, to vary the grid potential, arrangements proposed in other relationships for the control of gas or vapor discharge devices may be used. It is further not indispensive that in each case gas discharge vessels be utilized, although these discharge vessels are preferred to others for large power. The control according to my invention may also be carried out at small power values with high vacuum electron tubes.

The guiding curve or template 26 which is determinative of the control process produces a movement of the spring biased lever 27—on the position of which the condition of illumination of photocell 43 depends.

The lever 27 carries a source of light 44. This light 44 is suitably connected to the network 31 by the circuits shown. Sieve-like screens 45 and 46 are disposed between the source of light and the photocell. The illumination of the photocell 43 depends on the reciprocal position of both screens. The advantage of dividing the total illumination of the photocell into a plurality of light bundles which are changed by the reciprocal displacement of the screens arises from the fact that by small changes in the position of lever 27 considerable and sharp changes in illumination of the photocell may be produced.

The photocell 43 is connected in the energizing circuit for the movable coil 47 of a nozzle bolometer 48. The photocell 43 and the rotating coil 47 are so arranged with reference to each other than an intermediate illumination corresponds to the intermediate or shown position of the bolometer lug 49, while a change of illumination, that is, either lighter or darker causes the bolometer lug to be displaced either toward the right or the left. The legs of the Wheatstone bridge of the bolometer are connected to the network 31 through transformer 50. A potential is therefore impressed across terminals 51 and 52 which corresponds to the position of the bolometer lug.

When the photocell receives normal illumination its resistance for the circuit, including the battery 53, photocell 43, and movable coil 47, is such that lug 49 is in its intermediate position. The potential across terminals 51 and 52 is thus zero. For stronger illumination of the photocell the bridge potential is of one value and for a weaker illumination the bridge potential may be of an equal value but displaced by 180° with reference to the first value.

The bridge potential is impressed on the grids 35 and 36 and 35' and 36' of the rectifiers 32 and 33 through the transformers 37 and 38. The anode potentials of the discharge devices of the rectifiers 32 and 33 are displaced with reference to each other in phase by 180° so that at a predetermined bridge potential of the bolometer either rectifier 32 or 33 is energized. If the bolometer deviates in one sense magnetic coupling 16 is energized whereas if the bolometer deviates in another sense magnetic coupling 17 is energized.

When the lug 49 is in the intermediate position neither of the rectifiers 32 nor 33 are in operation. Both couplings 16 and 17 are therefore deenergized. In this case it is necessary that coupling 13 be energized. This is in dependence directly on the position of the bolometer lug 49 but is attained indirectly by reason of the non-conducting condition of both rectifiers 32 and 33.

To effect the energization of coupling 13, the grids 36" of the rectifier 34 are connected to corresponding poles of windings 28 and 29 through resistors 41 and 42. The control grids 35" of the rectifier 34 obtain an alternating potential through transformer 39 which by reason of the parallelly connected capacitor 40 is displaced by 90° with reference to the anode potential. So long as couplings 16 and 17 do not carry current, i. e., so long as rectifiers 32 and 33 are not ignited, the grids 36" of rectifier 34 are at cathode potential and the discharge devices of rectifier 34 are conducting. On the other hand, when one of the rectifiers 32 or 33 is in operation, the control grids 36" receive a negative potential through resistors 41 and 42 and rectifier 34 is blocked. The magnetic coupling 13 is, therefore, instantly energized when neither coupling 16 nor 17 is energized.

In lieu of the resistance connection between the couplings 16 and 17 on the one side and the grids 36" of rectifier 34, other means may be applied to transfer the electrical condition of both couplings 16 and 17 to the grids of rectifier 34. For example, in the grid circuits of rectifier 34 relay contacts may be connected which are dependent on the current or potential of couplings 16 and 17. In any case, the final result is that the third working circuit, that is, the circuit for coupling 13, is energized each time neither of the circuits for coils 28 and 29 is energized.

From the description of the embodiment of the invention illustrated in the drawing it appears that a series of control means is necessary to transfer the movement of the feel lever 27, which touches the template 26, to the working circuit of the three magnetic couplings 16, 17 and 13. In this transferring process the tracer lever 27, with the illumination device 44 mounted thereon, the photocell 43 with the sieve-like screens 45 and 46 inserted between the photocell and the illuminating device, the nozzle bolometer 48 which is controlled by the rotating coil system 47, and finally the rectifiers 32, 33 and 34 which are dependent on the bridge potential of the bolometer 48, are arranged to a certain extent in series with each other.

Of particular significance is the structure of the control means which transfers the condition of the bridge connection of the bolometer to the operating circuit of the three magnetic couplings 16, 17 and 13. The invention relates to a control plan which is of general significance and may be applied otherwise than for a tracer lever control. The basic problem consists in that by a feeler of any general type, of which the bolometer lug of the bolometer 48 may be identified as one, at least two operating circuits are to be controlled and controlled in such manner that each of the two positions of the feeler correspond to a condition of the working circuit, for example the switching in or the switching out of the circuit. Both positions of the feeler may be treated the same and, for example, in both cases a contact may be opened or closed which opens or closes a working circuit with the position. Considerable difficulties are encountered when arrangements are involved that are as sensitive as the nozzle bolometer, i. e., arrangements in which mechanical contacts are not actuated. The bolometer difficulties are further minimized since this instrument cooperates with an electrical bridge circuit and since such a bridge circuit operates with most sensitivity when only both bridge conditions corresponding to the deviation from the equilibrium position are utilized for the control in one or the other sense. In both deviation positions the bridge circuit makes available a control potential, in the intermediate position the control position is zero, and control impulses cannot therefore be derived from the bridge.

All of these difficulties are sidetracked according to the invention by controlling the working circuit control between feeler in one of the positions not directly from the feeler but indirectly from the other working circuits, and indeed in such manner that the condition variations of the latter working circuits which are in turn dependent on the position of the feeler are transferred to the indirectly controlled circuit. A feeler which in itself, as the bolometer of the embodiment, has only two control positions may in this manner control three working circuits. For three working circuits control means may now be provided which cooperate with electrical bridge circuits and operate also in the equilibrium position of the bridge circuit when the bridge potential is zero, to provide, although indirectly, a control impulse for the third circuit.

It has already been pointed out that the feeler is to be regarded from the standpoint of the invention not only as the feeler 27 of the embodiment but also as the lug of the nozzle bolometer 48. For feeler control of a shaving planer device an arrangement may on the other hand be selected with advantage in which between the nozzle bolometer and the mechanical feel lever another photocell arrangement is inserted. In this manner a control arrangement is attained which from the viewpoint of theoretical technique possesses a high degree of sensitivity but in spite of this high degree of sensitivity a practical standpoint is very rugged. Finally above all I attain in this manner a system in which the highly sensitive nozzle bolometer is completely mechanically separated from the control parts coupled to the template because the coupling between the feeler lever and the nozzle bolometer takes place through inertialess means as light rays.

I am, of course, aware that others skilled in the art, particularly after having had the benefit of the teachings of my invention, may devise other uses for my control than the application shown and may provide other systems of control that may accomplish substantially the same novel results. I believe that my invention is of sufficient breadth to include such other modifications and uses. I, therefore, wish to be limited only by the appended claims as interpreted by my disclosure and limited by pertinent prior art.

I claim as my invention:

1. In a system of control for a machine tool, in combination, a tool support; a motor for moving the support; a magnetic coupling adapted to interconnect the motor and tool support to cause said support to move in a given direction; a second magnetic coupling adapted to interconnect the motor and tool support to cause said support to move in a given direction normal to the movement of the support when said first magnetic coupling is energized; a third magnetic coupling adapted to interconnect the motor and the support to cause said support to move in the opposite direction to the said given direction normal to the movement of the support when the first magnetic coupling is energized; three electronic devices adapted when in conducting condition to energize said respective magnetic couplings; a guide; and means, engaging the guide, adapted to selectively place said electronic devices in conducting condition.

2. In a system of control for a machine tool, in combination, a tool support; a motor for moving the support; a magnetic coupling adapted to interconnect the motor and tool support to cause said support to move in a given direction; a second magnetic coupling adapted to interconnect the motor and tool support to cause said support to move in a given direction normal to the movement of the support when said first magnetic coupling is energized; a third magnetic coupling adapted to interconnect the motor and the support to cause said support to move in the opposite direction to the said given direction normal to the movement of the support when the first magnetic coupling is energized; three electronic devices adapted, when in conducting condition, to energize said respective magnetic couplings; a guide, photo-electric means adapted to selectively place said electronic devices in conducting condition; and means coacting with the guide adapted to vary the operating effect of said photo-electric means.

3. In a system of control for a machine tool, in combination, a tool support; a motor for moving the support; a magnetic coupling adapted to interconnect the motor and tool support to cause said support to move in a given direction; a second magnetic coupling adapted to interconnect the motor and tool support to cause said support to move in a given direction normal to the movement of the support when said first magnetic coupling is energized; a third magnetic coupling adapted to interconnect the motor and the support to cause said support to move in the opposite direction to the said given direction normal to the movement of the support when the first magnetic coupling is energized; three electronic devices adapted, when in conducting condition, to energize said respective magnetic couplings; a guide; a bolometer adapted to selectively place said electronic devices in conducting condition; a photo-cell adapted to control the bolometer; and means coacting with the guide adapted to vary the operating effect of said photo-cell.

4. In a system of control for a machine tool, in combination, a tool support; a motor for moving the support; a magnetic coupling adapted to interconnect the motor and tool support to cause said support to move in a given direction; a second magnetic coupling adapted to interconnect the motor and tool support to cause said support to move in a given direction normal to the movement of the support when said first magnetic coupling is energized; a third magnetic coupling adapted to interconnect the motor and the support to cause said support to move in the opposite direction to the said given direction normal to the movement of the support when the first magnetic coupling is energized; three electronic devices adapted, when in conducting condition, to energize said respective magnetic couplings; a guide; a bolometer adapted to selectively place said electronic devices in conducting condition; a photo-cell adapted to control the bolometer; a source of radiation for illuminating the photo-cell; and means, coacting with the guide, adapted to vary the radiation falling on the photo-cell.

WALTER FOUQUET.